Sept. 27, 1966 V. F. COTY 3,275,610
MICROBIAL SYNTHESIS OF POLYMERS
Filed March 24, 1964
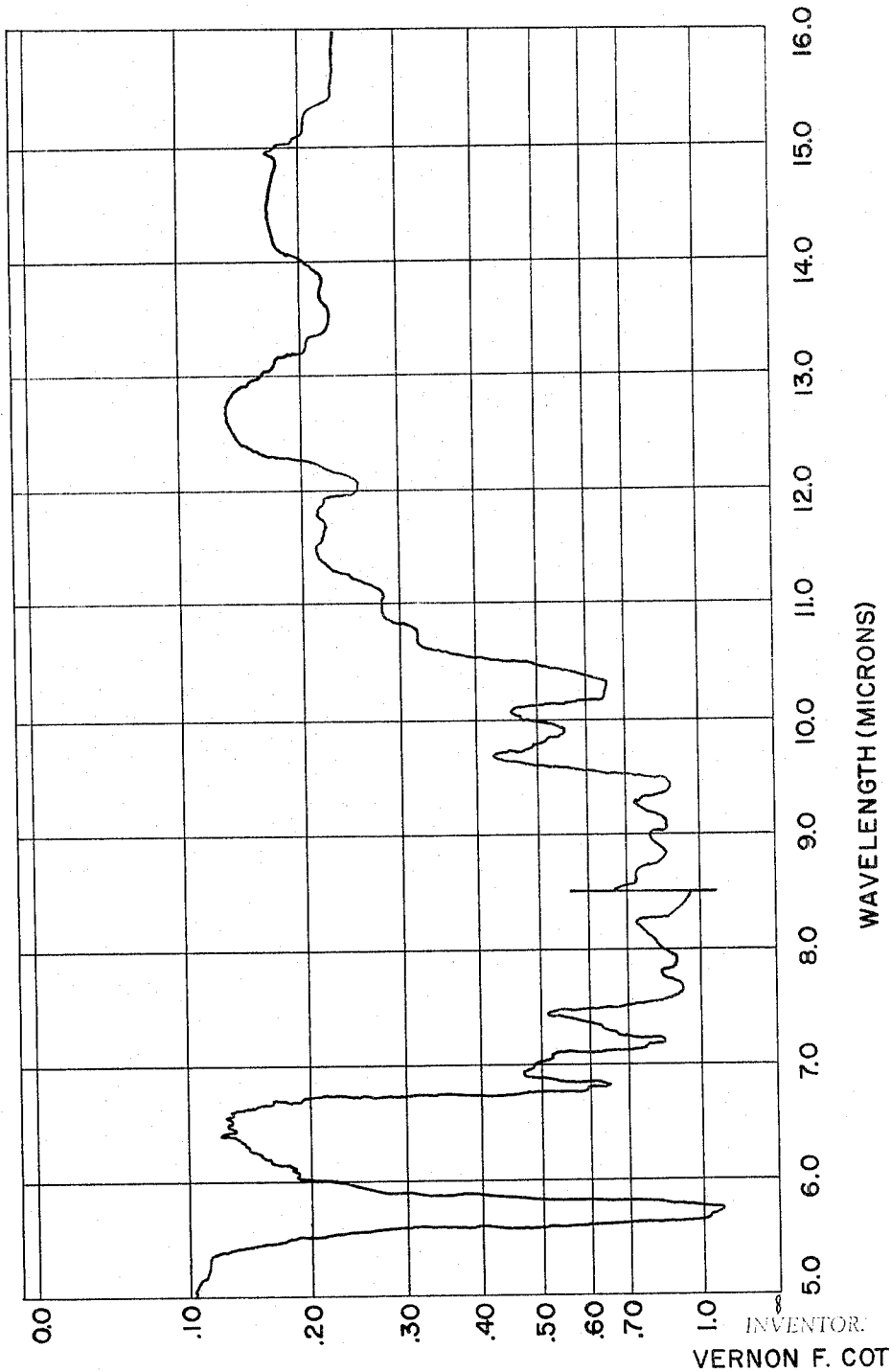
INVENTOR.
VERNON F. COTY
BY
ATTORNEY

United States Patent Office 3,275,610
Patented Sept. 27, 1966

3,275,610
MICROBIAL SYNTHESIS OF POLYMERS
Vernon F. Coty, Trenton, N.J., assignor to Mobil Oil Corporation, a corporation of New York
Filed Mar. 24, 1964, Ser. No. 354,231
16 Claims. (Cl. 260—80)

This invention relates to a method of making polymers by microbial synthesis and to polymers formed by the method. Among other advantages the invention is capable of producing good yields of polymer in a period of time as short as one day and even less.

The invention generally comprises feeding to a microorganism as herein defined a four-carbon aliphatic carboxylic acid selected from the group consisting of an unsaturated acid, an unsaturated acid substituted by an oxygen-containing organic radical, a saturated acid, and a saturated acid substituted by an oxygen-containing organic radical. Lower alkyl ester derivatives of the foregoing acid are useful in place thereof. Preferred oxygen-containing organic radicals are hydroxy, keto, and aldehyde radicals. A conventional aqueous mineral nutrient, in which the acid or ester is present as the sole source of carbon, is inoculated by the microorganism, and then incubated, with stirring. Polymer is formed in the cells, and more particularly in the form of discrete granules. After incubation, the cells are separated from the aqueous medium, and the polymer is suitably removed therefrom.

The polymers comprise linear chains in which the aliphatic acid, or ester derivative of the same, may be considered to be a unit or building block. Each polymer or chain is made up of a plurality of such units in a stereoregular arrangement, and in addition each exhibits unique effects or structural characteristics which are the result of the microbial action, such as the presence of chemical groups which are absent in the original acid or ester. For example, a polymer produced as a result of feeding 2-methylacrylic acid to a microorganism is characterized by the presence of hydroxy and carboxy groups, and it is believed that these are linked together as in ester linkages, that is, the hydroxy group of one molecule of acid is connected to the carboxyl group of another molecule of acid, it being understood that in the formation of such link water is split out, as in the familar reaction of an organic acid with an alcohol. It is considered that even though the acid contains no hydroxy groups, the latter are put on the polymer by microbial action. The polymer exhibits distinctive solubility behavior, being soluble in methyl ethyl ketone, chloroform, pyridine, and methylene dichloride, and insoluble in water, methanol, ethanol, acetone, and carbon tetrachloride; it has a water white color, and a melting point of 215–220° C. In general, the polymers range in color from water white to milky white, have melting points in the range of about 175 to about 250° C., and are soluble in chloroform, pyridine, and methylene dichloride, and insoluble in water, methanol, ethanol, acetone, and carbon tetrachloride. They are all thermoplastic film formers, with the films produced by them exhibiting varying degrees of flexibility, and generally being releaseably adherent to smooth surfaces.

The polymers are useful in respect of their film-forming ability, by means of which they may be employed to coat various surfaces to impart protective or decorative effects.

Considering the invention in more detail, the aliphatic acid which forms the sole source of carbon for the microorganism is suitably chosen from unsaturated monobasic acids having four carbon atoms. Preferably the unsaturation (carbon to carbon unsaturation) is at a terminal carbon atom, although it can be non-terminal. Suitable species are 2-methylacrylic acid and vinyl acetic acid; and also crotonic acid, which is capable of leading to polymer yields as high as 72% by weight, based on the acid.

Another suitable group of acids comprises the unsaturated acids having hydroxy or keto substituents, such as the hydroxy-3-butenoic acids where the double bond is in the 3 position and the hydroxy group is in the 2 or 3 or 4 position. Another acid is 2-keto-3-butenoic acid. Also suitable are the hydroxy-2-butenoic acids where the double bond is in the 2 position and a hydroxy group is in the 2 or 3 or 4 position. An additional example is 4-keto-2-butenoic acid.

Useful saturated acids include butyric and isobutyric acids. Other acids are hydroxy and keto derivatives of the latter, and include the 2-, 3-, or 4-hydroxybutyric acids and the 2-, 3-, or 4-ketobutyric acids. More than one hydroxy group can be present, as in the trihydroxybutyric acids.

Substituted isobutyric acids comprise another suitable group, wherein the substitution may be an alpha- or beta-hydroxy group, and these acids may be saturated or unsaturated. Another acid is beta-keto-isobutyric acid.

Other four carbon acids include aldehyde acids like butanal acid.

Dibasic acids are another preferred group, including saturated and unsaturated acids, and hydroxy- and keto-substituted acids, as exemplified by succinic, methyl malonic, maleic, fumaric, malic, tartaric, and oxaloacetic acids.

Lower alkyl ester derivatives of any of the foregoing acids are contemplated, such as the methyl, ethyl, and higher esters, and including illustrative compounds like ethyl ester of acetoacetic acid, methyl ester of 2-methylacrylic acid, methyl ester of alpha-hydroxybutyric acid, and the like.

Also, mixtures of two or more monobasic acids or ester derivatives, or two or more dibasic acids or ester derivatives are suitable, as are mixtures of a monobasic and a dibasic acid or ester, or mixtures of an acid and an ester.

The preferred microorganism is a Nocardia, particularly N. salmonicolor, but also including N. asteroides, N. opaca, N. corallina, and N. rubra. Also useful are the genera Azotobacter, Bacillus, Micrococcus, Rhizobium, and Rhodospirillum, as illustrated by species such as A. chroococcum, A. agilis, A. indicus, B. megaterium; by B. mycoides, B. subtilis, B. cereus, B. anthracis; by M. halodenitrificans, M. denitrificans; by Rh. leguminosarum, Rh. phaseoli, Rh. trifoli, Rh. lupini, Rh. japonicum; and by R. rubrum, R. fulvum.

The mineral nutrient, comprising mineral salts, is conventional. These salts furnish ammonium, nitrate or nitrite, potassium, ferrous or ferric, calcium, magnesium, phosphate and sulfate ions, as well as ions of trace elements such as zinc, manganese, copper, and molybdenum. As water is included in the nutrient mixture, most of these mineral salts will usually be present in sufficient quantity in ordinary potable water supplies. However, it is desirable to add the salts to the mixture to insure their presence in sufficient quantity for growth. Usually the mixture consists primarily of water, which may constitute 99%, or more, by weight of the liquid phase of the mixture, although it may also constitute a lesser portion, going down to 50% by weight of the liquid phase. Generally, any proportion of water heretofore employed in microbial synthesis may be used.

It will be appreciated that in view of the presence of salts in the aqueous medium, at least some of the aliphatic acids can form a salt, such as a sodium, potassium, or other metal salt. Salt formation does not interfere with the utilization of the acid.

The culture mixture is maintained under conditions to insure optimum growth of the microorganism. The temperature, for example, should be maintained between about 20° and about 55° C., preferably in the neighborhood of 30° C. The pH is maintained near neutrality, namely, about 7.0, although it may range between about 5.5 and 8.5.

It is desirable to maintain the mixture in a condition of agitation as by shaking, or by using propellers, paddles, rockers, stirrers, or other means ordinarily employed for effecting agitation of a liquid mixture.

Both the microbial growth process and the microbial synthesis are preferably done by employing reactors open to the atmosphere. With agitation of the mixture, the surface thereof exposed to the atmosphere is continuously renewed and oxygen is taken up. If desired, oxygen may be supplied by bubbling it or air through the mixture, thereby also providing the desired agitation.

Mention has already been made that microbial syntheses conducted by the present method may be completed in times as short as one day. The incubation period may of course extend longer than a day, and frequently does, but it is of interest to note that many microbial conversions, including syntheses, have in the past required periods of a week or two, or more, within which to produce appreciable growth. In some cases the time may be less than a day, as by starting out with a quantity of cells previously grown and feeding to them a four-carbon acid or ester of the kind described. In this way, the yield of cells may be doubled within a space of time corresponding to their generation time, which may run as low as 3 or 4 hours.

After termination of the microbial synthesis, the cells may be harvested in any suitable way, conveniently by centrifuging, and then preferably dried. Yields of dry cells may range up to 66% by weight of the carbon compound. Under microscopic examination, polymer may be visible in the form of inclusion bodies in the cells. The polymer may be removed from the cells in any desired way, but a convenient method comprises dispersing the cells in water and exposing the dispersion to the high frequency oscillations of an ultrasonic device such as a Branson Sonofier to rupture the cells. Cell debris may then be removed from the dispersion by centrifugation, a step wherein the water is poured off leaving a debris or paste which is then dried. The paste is extracted with a polymer solvent such as chloroform which also dissolves lipids, as in a Soxhlet apparatus, and the resulting extract comprises a clear solution of polymer and lipids. The solvent is evaporated away, and the solids are washed with a lipid-solvent polymer-nonsolvent such as ether to dissolve the lipids, leaving behind the solid polymer, which is separated, and the last amounts of ether removed by evaporation. The polymer is usually recovered in the form of a film.

Cell rupture may be accomplished in other ways, including conventional grinding of the cells in the presence of abrasives, shaking the cells with abrasives, exposing the cells to lysozyme, compressing and releasing the pressure as in a French pressure cell, alternate freezing and thawing, etc. Whatever method is used, it is desirable at some stage in the subsequent processing to obtain a clear protein-free solution of the polymer, from which lipids have been or will be removed, and from which the polymer is recovered. The protein is produced intracellularly at the same time as the polymer, and a portion thereof tends to be carried along with the polymer unless precautions, such as those described, are observed.

A further method for recovering the polymer comprises extracting the grown cells with a lipid- and polymer-solvent, such as a chloroform-methanol mixture, to dissolve the polymer and lipids, evaporating solvent away from the extract to give the solids, washing the latter with a lipid-solvent polymer-nonsolvent such as ether, to dissolve away the lipids, then dissolving the solids in a solvent like chloroform and refluxing to form a solution, filtering the latter, and recovering the clear filtrate comprising the polymer dissolved in chloroform. Evaporation of the chloroform gives the solid polymer. Other lipid- and polymer-solvents are pyridine, a methylene dichloride-ethanol mixture, a 1,4-dioxane-ethanol mixture, and the like. Besides ether, the lipid-solvent polymer-nonsolvent may be hexane, acetone, petroleum ether, etc.

Another procedure is illustrated in Examples 1 and 3. Yields of polymer are at least about 5% by weight of the dry cells, but frequently at least 25%, with the yield in some cases approaching 70 to 80%. The polymer may be purified further, if desired, by recrystallization from a solvent.

The invention may be illustrated by the following examples.

Example 1

An aqueous mineral salt mixture was prepared by dissolving the following salts in enough water to make one liter of solution.

| | G. |
|---|---|
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |
| Urea | 1.5 |

The solution had a pH of about 7.0. In it 1 g. of 2-methylacrylic acid was dissolved, and the mixture placed in a 2-liter shake flask, inoculated with *Nocardia salmonicolor*, strain 107–332, and incubated 32° C. The mixture was shaken on a gyrorotatory shaker over a period of 4.5 days, with 1 g. of 2-methylacrylic acid being added per day for a total of 4.5 g. The mixture was then centrifuged to separate the cells and the latter were dried over phosphorous pentoxide. Three grams of dried cells were obtained, representing a conversion of 66% based on the weight of acid employed. They were extracted with a 2:1 mixture of chloroform and methanol to remove the lipids and polymer, and on the basis of the amount of lipids extracted, it was apparent that the dried cells comprised 25% total lipids.

The chloroform-methanol extract was mixed with diethyl ether to dissolve the lipids and precipitate the polymer. Approximately 0.15 g. of polymer was obtained, comprising 19% by weight of the lipid-polymer fraction or 5% by weight of the dried cells. The polymer was then dissolved in chloroform, giving a slightly cloudy solution, and this was filtered through a very fine sintered glass funnel. The resulting solution or filtrate was clear. It was evaporated to remove solvent, leaving behind the solid polymer, in the form of a substantially colorless film which tended to adhere to the glass surfaces of the container but which could readily be peeled therefrom by pulling. The film was particularly characterized by being rubbery and elastic. It had a melting point of 215–220° C. and was soluble in methyl ethyl ketone as well as in chloroform, pyridine, and methylene dichloride. It was insoluble in water, methanol, ethanol, acetone, and carbon tetrachloride.

The polymer was dissolved in chloroform and its infrared absorption pattern determined in a Perkin-Ellmer 237 grating infrared spectrophotometer, with the results shown in the accompanying drawing, where the absorbance of the polymer is plotted against the wave length in microns of the infrared radiation. The absorbance is the reciprocal of the transmittance, and the latter is equal to log $I_0/I$, where $I$ is the amount of infrared radiation coming through the sample and $I_0$ is the amount of infrared radiation coming from the reference beam and falling on the sample. In the curve of the drawing, the dips represent absorption bands. The following characteristic absorbance maxima in the infrared region, in microns, are noteworthy: 5.72, 6.82, 7.20, 7.65, 7.93, 8.48, 8.83, 9.07, 9.47, 9.90, 10.28, 12.07, and 13.50.

Example 2

Cells were grown in the same way as in Example 1 but using 3-butenoic acid in place of 2-methylacrylic acid. After centrifuging, the cells were resuspended in 20 cc. of water and subjected to ultrasonic disintegration in a Branson Sonofier. The debris was spun down in the centrifuge, the supernatant poured off, and the debris then dried over phophorous pentoxide. It was refluxed with chloroform in a Soxhlet apparatus to dissolve lipids and polymer, after which the clear chloroform solution was evaporated, leaving a solid material comprising lipids and polymer. These solids were washed with ether to dissolve the lipids, and the mixture was then decanted, leaving the solid polymer. Evaporation of any remaining ether left the polymer in form of a milky white, pliable, tearable film having a melting point of 178–184° C. The polymer was insoluble in methyl ethyl ketone, water, methanol, ethanol, acetone, and carbon tetrachloride, but soluble in chloroform, pyridine, and methylene dichloride.

Example 3

Using the procedure of Example 1, a liter of the aqueous mineral medium was taken and to it there was added a total of 2 g. of alpha-hydroxybutyric acid. The same microorganism was used, and after incubation for a period of 4 days, the yield of dry cells was 0.73 g. and the yield of polymer was 5% of the weight of the dry cells. The polymer was purified by dissolving in chloroform and filtering the solution through a very fine sintered glass funnel. The resulting clear solution was evaporated, leaving a milky white, pliable, polymer film having a melting point of about 178° C. It exhibited the solubility behavior of the polymer of the preceding example.

It will be understood that the invention is capable of obvious variations without departing from its scope.

In the light of the foregoing description, the following is claimed:

1. Method of producing a thermoplastic polymer by microbial synthesis which comprises dissolving in an aqueous mineral nutrient a carbon compound selected from the class consisting of a four-carbon aliphatic carboxylic acid and a lower alkyl ester derivative thereof, said acid being selected from the group consisting of an unsaturated acid, an unsaturated acid substituted by an oxygen-containing organic radical, a saturated acid, and a saturated acid substituted by an oxygen-containing organic radical, inoculating the aqueous nutrient with a microorganism selected from the following species of Nocardia, Azotobacter, Bacillus, Micrococcus, Rhizobium, Rhodospirillum: *N. salmonicolor, N. asteroides, N. opaca, N. corallina, N, rubra, A. chroococcum, A. agilis, A. indicus, B. megaterium, B. mycoides, B. subtilis, B. cereus, B. anthracis, M. halodenitrificans, M. denitrificans, Rh. leguminosarum, Rh. phaseoli, Rh. trifoli, Rh. lupini, Rh. japonicum, R. rubrum,* and *R. fulvum,* said carbon compound being the sole source of carbon, incubating the resulting mixture, forming said polymer intracellularly of the microorganism, harvesting the cells, rupturing the cell walls and recovering the resulting debris, solvent extracting polymer from the debris in the form of a clear solution of the polymer, and recovering polymer from said solution in a yield of at least about 5% by weight of the dried cells, said polymer being a polymer of said carbon compound and being characterized by the presence of a plurality of hydroxyl and carboxyl groups at least some of which are linked to form ester groups, and said polymer forming flexible films.

2. The method of claim 1 wherein said carbon compound is said acid.

3. The method of claim 1 wherein said carbon compound is the ester of said acid.

4. The method of claim 1 wherein said microorganism is a Nocardia.

5. The method of claim 1 wherein said acid is an unsaturated acid.

6. The method of claim 1 wherein said acid is an unsaturated acid which is substituted by an oxygen-containing organic radical.

7. The method of claim 6 wherein said radical is a hydroxyl radical.

8. The method of claim 6 wherein said radical is a keto radical.

9. The method of claim 1 wherein said acid is a saturated acid.

10. The method of claim 1 wherein said acid is a saturated acid which is substituted by an oxygen-containing organic radical.

11. The method of claim 1 wherein said acid is a dibasic acid.

12. The method of claim 11 wherein said dibasic acid is an unsaturated acid.

13. The method of claim 11 wherein said dibasic acid is substituted by an oxygen-containing organic radical.

14. The method of claim 1 wherein said acid is 2-methylacrylic acid.

15. A thermoplastic polymer comprising the microbial synthesis product produced in accordance with the method of claim 14 and characterized by being soluble in methyl ethyl ketone, chloroform, pyridine, and methylene dichloride and insoluble in water, methanol, ethanol, acetone, and carbon tetrachloride, said polymer forming releasably adherent flexible films, having a melting point of about 215 to 220° C., and having a water white color, and said polymer when dissolved in chloroform having the characteristic absorbance maxima in the infrared region, in microns, as particularly set forth in the accompanying drawing, including maxima at 5.72, 6.82, 7.20, 7.65, 7.93, 8.48, 8.83, 9.07, 9.47, 9.90, 10.28, 12.07, and 13.50 microns.

16. A thermoplastic film-forming polymer comprising the microbial synthesis product produced in accordance with the method of claim 14 and characterized by the fact that when dissolved in chloroform, the polymer has characteristic absorbance maxima in the infrared region, in microns, as particularly set forth in the accompanying drawing, including maxima at 5.72, 6.82, 7.20, 7.65, 7.93, 8.48, 8.83, 9.07, 9.47, 9.90, 10.23, 12.07, and 13.50 micorns.

References Cited by the Examiner
UNITED STATES PATENTS 3,121,669    2/1964    Baptist _____ 195—30

JOSEPH L. SCHOFER, *Primary Examiner.*

L. WOLF, *Assistant Examiner.*